W. S. WESTON.
HYDRAULIC CLUTCH AND TRACTION EQUALIZER.
APPLICATION FILED JULY 5, 1917.

1,306,872.

Patented June 17, 1919.
2 SHEETS—SHEET 1.

Witnesses:—

Inventor:—
William S. Weston

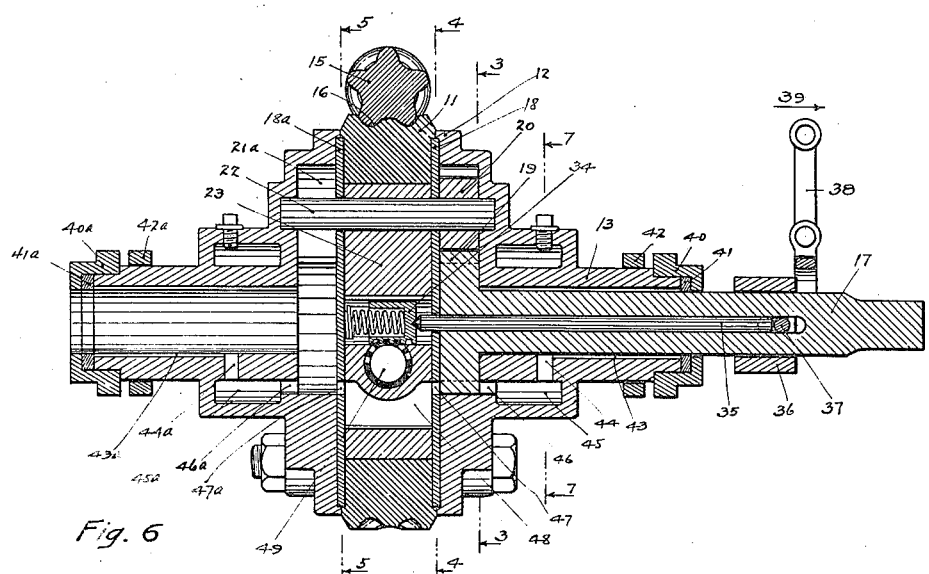
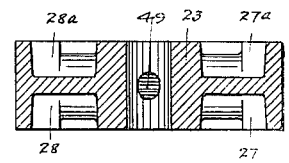
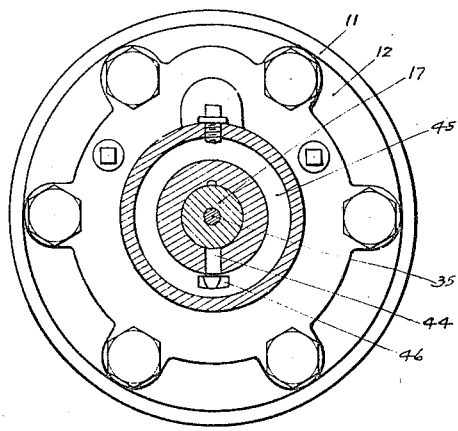
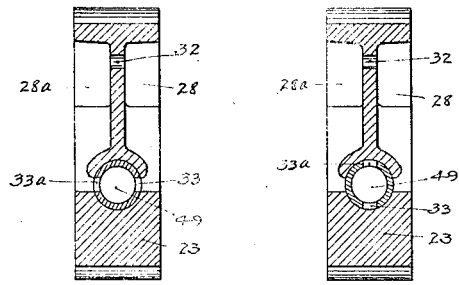

UNITED STATES PATENT OFFICE.

WILLIAM S. WESTON, OF HOUSTON, TEXAS.

HYDRAULIC CLUTCH AND TRACTION EQUALIZER.

1,306,872. Specification of Letters Patent. Patented June 17, 1919.

Application filed July 5, 1917. Serial No. 178,572.

*To all whom it may concern:*

Be it known that I, WILLIAM S. WESTON, a citizen of the United States, residing in the city of Houston, county of Harris, and State of Texas, have invented certain new and useful Improvements in Hydraulic Clutches and Traction Equalizers, of which the following is a full, clear, and exact description.

My invention relates to a device for automobiles or other motor driven vehicles designed to be used in the place of the mechanism commonly known as the differential, and comprises, fundamentally, improved hydraulic clutch mechanisms whereby the power of the motor is transmitted to the two traction wheels, and new and improved means whereby a self-regulated balance of the hydraulic pressure in these clutch mechanisms is utilized to give and maintain an equal transmission of power to both wheels during normal safe working conditions.

The objects of my invention are, first, to provide clutch mechanisms connected to each traction axle whereby the full power of a motor running at high speed may be delivered gradually and continuously direct to the traction wheels irrespective of their traveling speed, and second, to provide in conjunction with the clutch a traction equalizing device which will allow a free relative movement of the two traction wheels when running the ordinary course of a trackless roadway, either fast or slow, or when turning sharp corners or turning around at slow speed, but which will not permit one wheel to race when on ice or slippery pavement or for any other cause when the other wheel is stuck or moving relatively slow.

An exact construction of a device whereby I attain these objects embodying the essential elements of my invention, together with other features of importance to its practical operation under both normal and abnormal conditions, is hereinafter fully described and clearly illustrated in the accompanying drawings which form a part of these specifications, and the elements of novelty are particularly pointed out in the claims.

Figure 1:
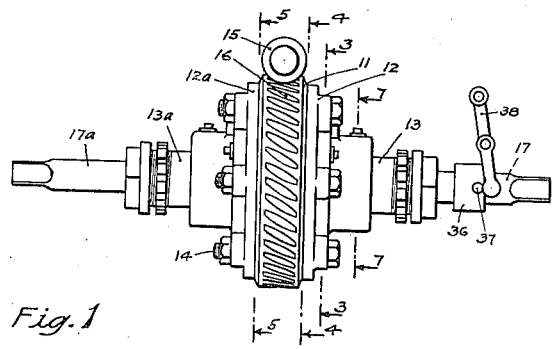
Figure 2:
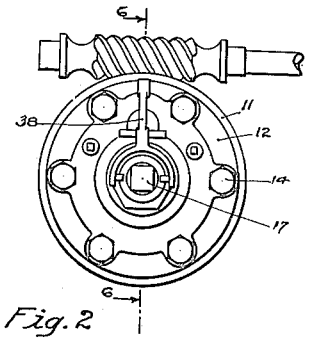
Figure 4:
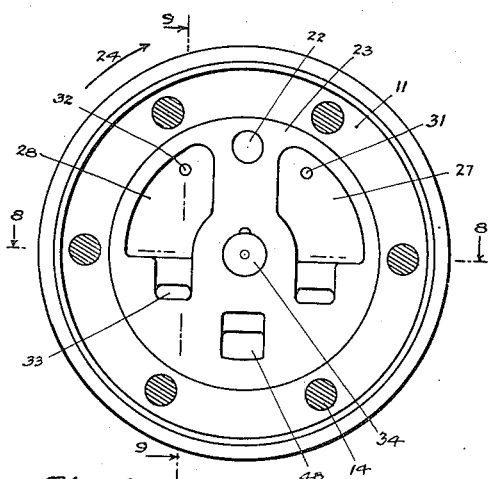
Figure 3:
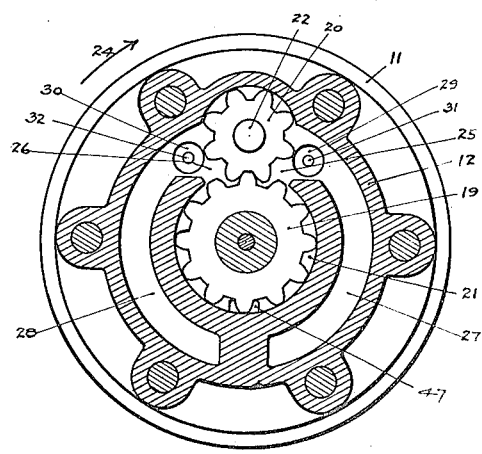
Figure 5:
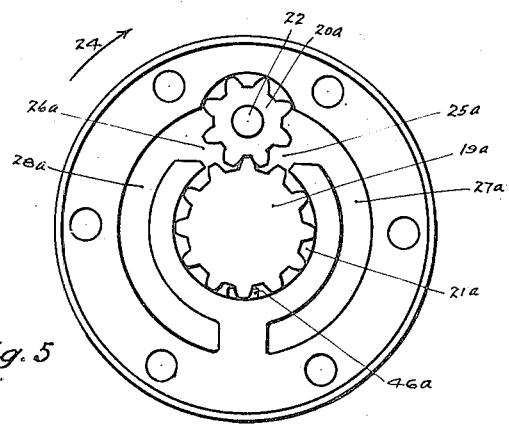

Figure 1 is a rear elevation of my invention and Fig. 2 an end elevation from the right of Fig. 1, both drawn to a smaller scale than the balance of the figures. Fig. 3 is a transverse section on the line 3—3 and Fig. 4 a transverse section through the bolts on the parting line 4—4 of Figs. 1 and 6. Fig. 5 is an elevation of the left hand end portion on the parting line 5—5 of Figs. 1 and 6 as viewed from the right with the bolts removed. Fig. 6 is a vertical longitudinal section on the line 6—6 of Fig. 2, with the axle and gears of the left hand end removed. Fig. 7 is a transverse sectional elevation on the line 7—7 of Figs. 1 and 6. Fig. 8 is a partial horizontal section of the valve carrying portion on line 8—8 of Fig. 4, and Figs. 9 and 10 partial vertical sections on the line 9—9 of Fig. 4 illustrating the open and closed position of the valve. The same numerals and letters of reference indicate the same parts in the several views.

The construction illustrated in Figs. 1 and 2 will readily be recognized as designed to occupy the place of the well known worm driven differential casing ordinarily supported in the rear axle housing of an automobile or motor truck. As the housing and supporting bearings are not elements in the invention and are not essential to its clear description they are not shown in the drawings and will not be described further. The traction wheels, being detachable from their axles as ordinarily constructed, are also omitted from the drawings and the traction axles are shown short with the ends squared for any suitable extension and connection with their wheels.

The construction, first described in general terms, comprises a power driven rotatable casing concentric with the two traction axles, two separate sets of spur gear pump gears carried by the casing in separate liquid tight recesses with one gear of each set attached to a traction axle, a small port connecting the compression sides of the two sets of pump gears, a second small port connecting the suction sides, and a manually operative valve for opening and closing a return passage from the compression to the suction sides of the pump gears. The construction is such that with the valve closed, the interdental spaces and recesses being filled with a liquid medium, a driven rotative movement of the casing is transmitted to the traction axles through an hydraulic pressure developed on the compression sides of the two sets of pump gears, while any normal variation in the relative rotative movement of the axles is taken care of by an equalization of the pressures through the connecting ports. With the valve wide open, permitting a practically unrestricted flow of liquid from the compression to the suction sides, the casing may be driven at a high speed with the traction axles standing still. When the valve is closed slowly while the casing is running at full speed the hydraulic pressure on the compression sides of the pump gears gradually increases until the entire power of the motor may be absorbed in pumping liquid through partially closed valve ports. By mechanical reaction the power so applied is transmitted to the traction axles and as they start and their speed picks up the valve may be closed completely.

Referring to the drawings, particularly Figs. 1 and 6, it is to be noticed that except for the valve operating mechanism the device is symmetrical and that the opposite axles and ends are duplicates. Parts on the left hand end which are duplicates or equivalents of parts on the right are therefore given the same reference numeral with the suffix small letter "a."

The rotatable casing comprises a centrally located ring 11 and end castings 12 and $12^a$ having hubs or journals 13 and $13^a$ all bolted together with bolts 14. This casing is driven by a worm 15 intermeshing with a worm gear 16 on the periphery of the ring 11. Through the opposite hubs and in perfect alinement with each other and the axis of the casing extend the traction axles 17 and $17^a$. Within the casing and between the ring and end castings are separating plates 18 and $18^a$. Within each end casting is a pair of spur gear pump gears 19, 20, and $19^a$, $20^a$, respectively in ends 12 and $12^a$, located in incomplete figure 8 recesses 21 and $21^a$ having a liquid tight conformation with the gears. See Figs. 3 and 5. Gears 19 and $19^a$, hereinafter called the primary gears, are concentric with the inner ends of the traction axles and preferably made integral therewith. Gears 20 and $20^a$, called the secondary gears, are mounted loose on a preferably common pin 22 extending through the separating plates and the intermediate part. In a casting 23 within the ring 11 and between the separating plates 18 and $18^a$ is located the valve mechanism and other governing features. See Figs. 4 and 6. This casting has a liquid tight fit around its periphery and between the plates and is held from turning by the pin 22 which is passed through it.

Referring now to Figs. 3 and 5 a rotation of the casing on the concentric axis of the axles would tend to carry the secondary gears in a planetary movement around the primary gears. The construction is the same for driving either forward or backward, but for clearness in the description the rotative movement of the casing for a forward movement only of the car will be considered and is indicated by the arrow 24 in the several figures. Assuming that the figure 8 recess had a continuous periphery fitting the gears and that the interdental spaces were filled with a liquid medium the rotation indicated would produce hydraulic pressure on one side of the gears in the vicinity where they intermesh, as at points 25 and $25^a$, and a suction on the opposite side at points 26 and $26^a$. At these points the figure 8 recesses are connected with auxiliary chambers, the points 25 and $25^a$ with chambers 27 and $27^a$ called compression chambers, and the points 26 and $26^a$ with chambers 28 and $28^a$ called suction chambers. These chambers are formed partly in the end castings and partly on opposite sides of the central casting 23 the parts of each chamber being connected through the separating plates by large round holes 29, 30 and $29^a$, $30^a$.

By comparing Figs. 3 and 5 in conjunction with Fig. 4 and bearing in mind that the secondary gears are mounted on the same pin it will be apparent that the compression and suction chamber for gears 19, 20 are directly opposite the corresponding chambers for gears $19^a$, $20^a$, and that those portions of the chambers on the opposite sides of casting 23 are also opposite and separated only by a medial wall of metal. A small port 31 through this wall connects the compression chambers and another small port 32 connects the suction chambers. The special function of these small ports will be disclosed when describing the operation.

In the lower portion of casting 23 is located a tubular stop-cock valve 49 adapted to be rotated approximately 90° to be opened or closed. When in the open position ports near one end of the tube register with openings into the compression chambers while ports near the other end register with openings into the suction chambers. Fig. 9 is a section showing the ports 33 and $33^a$ opening into the suction chambers 28 and $28^a$. A section through the other end of the valve tube would be like Fig. 9 and show ports opening into the compression chambers. In the open position a free flow of liquid is therefore possible from both compression chambers through the tube into both suction chambers. When the valve is rotated to the closed position as shown in Fig. 10 the ports at both ends are closed and all four chambers are shut off from each other except for the small permanent ports 31 and 32 already described. In this connection it may be noted that the hydraulic pressure on the closed valve will be equal on opposite sides under normal working conditions and that the valve is therefore easier to operate.

The complete valve operating mechanism comprises gear teeth cut in a portion of the circumference of the valve tube at the center of its length as clearly indicated in a solid black cross-section in Fig. 6; a spring balanced plunger 34 in the axial center of casting 23 having a gear rack cut on one side to intermesh with the teeth in the valve tube, a rod 35 located in one of the traction axles provided with a cone point at its inner end bearing against the plunger, a sleeve 36 with a pin 37 passing through an elongated hole in the axle and adapted to bear against the outer end of the rod 35, and a shifter fork 38. The shifter fork is adapted to operate the sleeve in one direction only to push the plunger 34 against its spring and rotate the valve to the open position. When the fork is released the recoil of the spring returns the plunger to its normal position with its head against the separating plate 18 and the valve is rotated back to closed position. Fig. 6 shows the plunger and valve moved part way toward the open position. The space occupied by the plunger conforms with it in such manner as to act like a dash-pot to prevent a too sudden closing of the valve.

The working of the device as a manually operated hydraulic clutch is simple. In the first place an application of hand or foot power through any suitable connection to throw the shifting fork in the direction indicated by the arrow 39 opens the valve, allows a free flow of liquid from the compression to the suction sides of the gears and permits a free planetary movement of the secondary gears around the primary. This position constitutes the open clutch and the casing may be rotated by the motor running at its most efficient speed without an appreciable amount of power being delivered to the traction axles. The clutch is closed by releasing the shifting fork and allowing the valve to be gradually closed by the recoil of the spring. This action gradually raises the hydraulic pressure on the compression side of the gears which in turn obstructs the free planetary movement of the secondary gears around the primary gears and causes the latter, which are integral with the axles, to come gradually into rotative movement with the casing. When the valve is entirely closed the traction axles will rotate at substantially the same speed as the casing, with only such loss as may be due to the leakage of liquid around the gears and bearings and through the valve.

A fundamental novel feature of my hydraulic clutch is founded in the fact that it is located beyond the point of maximum reduction of speed in the transmission system between a high speed motor and the traction axles, the last reduction being through the ratio of the worm and worm gear, making the speed of its operation relatively slow, and in consequence the power of the motor up to the limit of its horsepower capacity while running at full speed may be gradually applied to the axles without a reduction of speed and an accompanying loss of power.

A second fundamental novel feature of my invention lies in the fact that with the hydraulic clutch made in two parts and applied in unison to the two traction axles I am able to utilize a balance of the hydraulic pressure developed therein to equalize the transmission of power to the axles at times of relative variation of speed in normal operation. Referring to Figs. 3 and 5 taken in connection with the rear view of the device shown in Fig. 1, if it is assumed that the automobile is turning to the right then the casing will rotate faster than the right hand axle and slower than the left, that is, the secondary gear 20 will have a slight relative forward movement about its primary 19 in the direction indicated by the arrow while the secondary gear 20$^a$ will have a slight relative backward movement about its primary 19$^a$. The forward movement of gear 20 is accomplished with the pumping of a small quantity of liquid through the port 31, the quantity being just enough to accommodate the backward movement of the gear 20$^a$. A statement which may help explain the action is this:—So far as the small quantity of liquid flowing through the port 31 is concerned gears 19 and 20 act as a pump against gears 19$^a$ and 20$^a$ acting as a hydraulic motor, although both sets of gears continue to perform their functions as a part of the clutch to rotate the axles in the same direction as the casing. Under normal running conditions the arithmetical average speed of the axles is equal that of the casing except for the loss due to leakage.

While the traction equalizing feature of the device is used in the place of a differential for small relative variations of speed, yet its construction is such that it cannot be considered a true differential in the sense of forming a positive connection between the two axles. A relative backward movement of one axle is not necessarily accompanied all the time by an equal forward movement of the other axle. The size of the port 31 is limited to a high pressure flow sufficient to accommodate the variation required in turning an automobile at a moderate safe speed. Under an abnormal speed of turning, that is, a speed at which there may be some danger of the machine being overturned, the restriction of flow of liquid through the port holds the rate of rotation of the casing within a maximum over that of the slow axle while the fast axle is free for a short period of operation to have its speed increased by the reaction of the road through the traction wheel. This operation is made possible by using large compression and suction chambers and only partly filling them with the liquid medium. During normal running the compression chambers will be full and the suction chambers nearly empty. At the instant of abnormal speed in turning the compression chamber of the fast axle, that is compression chamber $27^a$ of axle $17^a$ for the turning movement described, will not receive liquid fast enough through the port 31 to replenish that which will be pumped around gears $19^a$ and $20^a$ into suction chamber $28^a$. This action eliminates any hydraulic pressure and for the moment produces a partial vacuum in chamber $27^a$. As soon as the abnormal turning movement comes to an end the pressure in the two compression chambers is restored through the port 31. It will be understood that during the action just described an equilibrium of conditions in the suction chambers 28 and $28^a$ is being established through the port 32.

While it is obvious that a traction equalizing mechanism of some sort is essential to the practical use of the double hydraulic clutch described and that the balance between the hydraulic pressures in the two parts may be used for that purpose, yet it is not essential that the action shall be confined to a limited variation of speed between the axles. So far as the clutch is concerned the ports 31 and 32 might be made large enough to merge the connected chambers into one compression and one suction chamber common to both sets of gears. With such large ports one axle might be held and the other axle driven at practically double the speed of the casing, as with the ordinary differential. The novel advantages attained by making the ports 31 and 32 small so as to limit the action of the equalizer to a range of variation of movement required for practical operation has already been stated at the beginning of these specifications.

A feature of importance in the construction of my device still to be described has to do with means for taking care of the leakage of liquid around the axles where they project through the hubs or journals of the end castings. A preferable construction is to provide stuffing box caps 40 and $40^a$ for the ends of the hubs adapted to hold felt washers or other suitable packing rings 41 and $41^a$ in compression around the axles. The caps may be interlocked with lock rings 42 and $42^a$. Oil grooves 43 and $43^a$ are formed in the bearings extending inward from the felt washers to within a short distance of the primary gears. The inner ends of the grooves are connected by passages 44 and $44^a$ with annular storage chambers 45 and $45^a$ in the hubs. These chambers are connected with the gear recesses by ports 46 and $46^a$ located at points on the periphery of the gears remote from the connection between the gear recesses and the compression chambers. A connection between the opposite storage chambers is obtained by ports 47 and $47^a$ in the separating plates and a passage 48 through the central casting 23.

The liquid medium used in the clutch is preferably a moderately viscous lubricating oil that will not congeal at ordinary low temperatures. During the periods of high operating pressure in the compression chambers some of the liquid will be forced down behind the gears and along the axles until it reaches the oil grooves, insuring perfect lubrication of these bearings. The surplus oil which reaches the axles will be gathered in the oil grooves and returned to the storage chambers through the connecting passages by the action of centrifugal force. The manner of the return of the oil from the storage chambers to the gear recesses and the gear pump circuits is explained as follows: To begin with, sufficient oil is used in the mechanism to completely fill the interdental spaces around the gears, the compression and storage chambers, but only a small fraction of the capacity of the suction chambers. The small amount of liquid in the suction chambers is not equally divided between them but fluctuates with every variation in the speed of the axles, the gears on the slow running side acting as a pump to force a small quantity over into the fast running side. Of course, the liquid so forced over comes back through the port connecting the suction chambers, but as it is not under pressure in those chambers it will not come back so fast. When one of the suction chambers becomes nearly empty the interdental spaces of the primary gear on that side will take liquid partly from the suction chamber and partly from the storage chambers through the port 46 and $46^a$.

The feature of importance to be noted in connection with the use of the storage chambers is that the margin of variation in the quantity of the liquid medium essential to the practical operation of the device is substantially equal to the capacity of these chambers. In other words with the compression chambers full, a prime necessity, either a small quantity of liquid in the storage chambers will suffice to keep the former full, or the storage chambers may be practically full without developing a hydraulic pressure against the felt rings and thereby causing a loss of the leakage.

It is to be noted that, although so described, I do not limit the application of my hydraulic clutch and traction equalizer to automobiles and motor trucks. It may be used in any system of power transmission where a high speed motor is to be thrown into driving connection with two axles or shafts running comparatively slow and having or requiring only a moderate variation in their relative speed.

It is further obviously clear that modifications may be made in the exact details of the different parts of my invention without changing their function and purpose.

What I claim as new and desire to secure by Letters Patent is:

1. A hydraulic clutch mechanism comprising a power driven rotatable casing, two separate sets of spur gear pump gears carried by the casing in separate liquid tight gear recesses, two shafts journaled in the casing concentric therewith and attached each respectively to one gear each of said sets of pump gears, a small port connecting the compression sides of said gear recesses, a second small port connecting the suction sides, and a manually operative valve for opening and closing a return passage from the compression to the suction sides of the gear recesses.

2. A hydraulic clutch mechanism comprising a power driven rotatable casing, two separate sets of spur gear pump gears carried by the casing in separate liquid tight gear recesses, two shafts journaled in the casing concentric therewith and attached each respectively to one gear each of said sets of pump gears, intercommunicating compression chambers and intercommunicating suction chambers for said separate gear recesses, and a manually operative valve for opening and closing a return passage from the compression to the suction chambers.

3. A hydraulic clutch mechanism comprising a power driven rotatable casing, two separate sets of spur gear pump gears carried by the casing in separate liquid tight gear recesses, two shafts journaled in the casing concentric therewith and attached each respectively to one gear each of said sets of pump gears, intercommunicating compression chambers and intercommunicating suction chambers for said separate gear recesses, a manually operative valve for opening and closing a return passage from the compression to the suction chambers, storage chambers for holding a surplus of the liquid medium, and means for replenishing the leakage from said gear recesses and compression and suction chambers.

4. A hydraulic clutch mechanism comprising a power driven rotatable casing, two separate sets of spur gear pump gears carried by the casing in separate liquid tight gear recesses, two shafts journaled in the casing concentric therewith and attached each respectively to one gear each of said sets of pump gears, intercommunicating compression chambers and intercommunicating suction chambers for said separate gear recesses, a manually operative valve for opening and closing a return passage from the compression to the suction chambers, storage chambers for holding a surplus of the liquid medium, and ports leading from said storage chambers into the gear recesses at points remote from the connections between the gear recesses and the compression and suction chambers.

5. A hydraulic power transmission device comprising a rotatable power driven member, two shafts concentric therewith, two hydraulic clutch mechanisms of the liquid pump type adapted to lock said shafts to said member, said hydraulic clutch mechanisms having constricted passages respectively connecting the compression sides and the suction sides thereof and also having a return passage from the compression to the suction sides, a valve for controlling said return passage, and means, including a shifter concentric with said member and said shafts, for actuating said valve when said transmission device is in operation.

WILLIAM S. WESTON.